United States Patent
Lim et al.

(10) Patent No.: US 8,178,073 B2
(45) Date of Patent: May 15, 2012

(54) MAKING METHOD FOR TITANIA NANOPARTICLE

(75) Inventors: Hyung Sup Lim, Ansan (KR); Hyung Joon Lim, Anyang (KR); Young Cheol Yoo, Ansan (KR); Osung Kwon, Ansan (KR)

(73) Assignee: Sukgyung AT Co., Ltd., Ansan (KR)

( * ) Notice: Subject to any disclaimer, the term of this patent is extended or adjusted under 35 U.S.C. 154(b) by 277 days.

(21) Appl. No.: 12/554,558

(22) Filed: Sep. 4, 2009

(65) Prior Publication Data

US 2011/0189605 A1   Aug. 4, 2011

(30) Foreign Application Priority Data

Sep. 5, 2008   (KR) .................. 10-2008-0087854

(51) Int. Cl.
*C01G 23/047* (2006.01)
(52) U.S. Cl. ........................................... 423/610
(58) Field of Classification Search .......... 423/610–616, 423/80–86
See application file for complete search history.

(56) References Cited

U.S. PATENT DOCUMENTS

| | | | |
|---|---|---|---|
| 6,387,349 B1 * | 5/2002 | Kulkarni et al. | 423/707 |
| 7,081,234 B1 | 7/2006 | Qi et al. | |
| 7,232,556 B2 | 6/2007 | Yadav | |
| 7,326,399 B2 | 2/2008 | Zhou et al. | |
| 7,344,591 B2 | 3/2008 | Zhou et al. | |
| 7,488,561 B2 | 2/2009 | Anno et al. | |
| 7,521,394 B2 | 4/2009 | Xie et al. | |
| 7,547,431 B2 | 6/2009 | Yadav et al. | |
| 7,763,232 B2 * | 7/2010 | Vitner et al. | 423/610 |
| 2006/0074173 A1 | 4/2006 | Kogoi et al. | |
| 2010/0035775 A1 * | 2/2010 | Viswanathan | 508/123 |

FOREIGN PATENT DOCUMENTS

WO   WO 2007/074436 A1 *  7/2007

* cited by examiner

*Primary Examiner* — Steven Bos
(74) *Attorney, Agent, or Firm* — Bishop & Diehl, Ltd.

(57) ABSTRACT

The present invention relates to a method of manufacturing titania nanoparticles, and specifically to a method of manufacturing titania nanoparticles wherein the particle size is uniform, it is possible to manufacture monodisperse particles without aggregation among particles, a uniform coating can be applied, that is suitable to large-scale production, and that can obtain high-resolution images by maintaining the toner electric charge and electric charge distribution; and the developer included in said titania nanoparticles.

8 Claims, 6 Drawing Sheets

MAKING METHOD FOR TITANIA NANOPARTICLE

CROSS-REFERENCE TO RELATED APPLICATIONS

This application claims priority to Korean application number 10-2008-0087854, filed on Sep. 5, 2008, which is incorporated herein by reference.

TECHNICAL FIELD

The present invention relates to a method of manufacturing titania nanoparticles, and more specifically, to a method of manufacturing titania nanoparticles wherein the particle size is uniform, it is possible to manufacture monodisperse particles without aggregation among particles, a uniform coating can be applied, that is suitable to large-scale production, and that can obtain high-resolution images by maintaining the toner electric charge and electric charge distribution; and the developer included in said titania nanoparticles.

BACKGROUND OF THE INVENTION

The dry developers used in electronic photography may be classified as one-part developers that use the toner itself, in which colorants have been dispersed among the terminal resin, and two-part developers wherein a carrier is mixed with the toner.

When copying using these developers, in order to establish a suitable process, the developer must have excellent fluidity, caking resistance, cohesiveness, electrostatic propensity, and cleaning. Inorganic fine particles have been added to the toner in order to increase said fluidity, caking resistance, cohesiveness, and cleaning.

Figure 1:
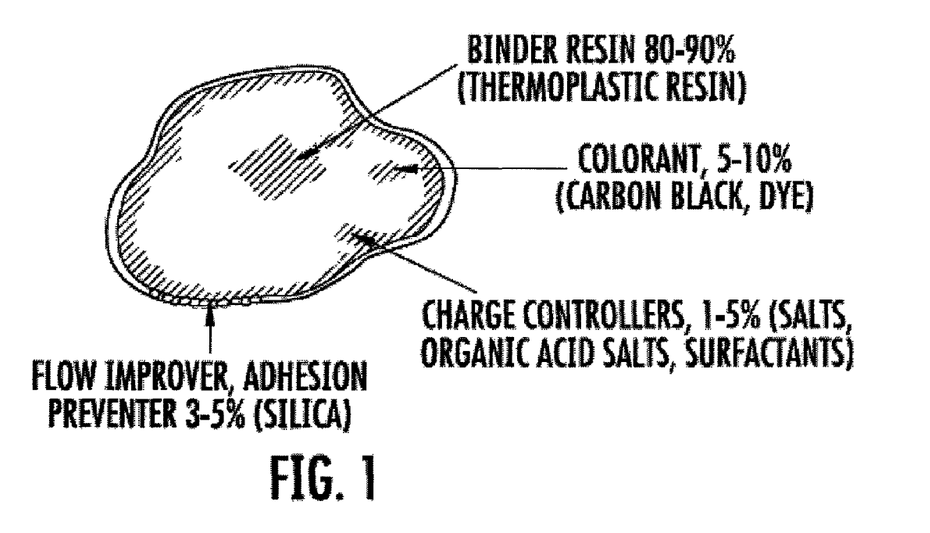
FIG. 1 shows a schematic diagram of toner that contains an external additive

In general, as shown in FIG. 1, external additives typically added to the toner surface have been inorganic particles such as silica ($SiO_2$) and alumina ($Al_2O_3$), fluoride microparticles such as vinylidene fluoride and PTFE (polytetrafluoroethylene), and acryl and styrene-acryl resin microparticles manufactured by emulsion polymerization. In FIG. 1, the units are %.

The inorganic particles of the prior art, such as silica, have a diameter of 7-50 nm and are added in order to provide the toner with the fluidity of a powder. Ordinarily, when an external additive with a low particle radius is added to toner, the fluidity is good, but if the silica particle size is too small, it sometimes occurs that the silica separates from the toner surface due to stress applied to the toner, accordingly causing a gradual deterioration in fluidity over time; the size of the external additive particles has a powerful impact on print quality. In addition, because these inorganic particles exist on the far outside surface of the toner, they substantially impact the electrostatic propensity of the toner.

However, hydrophobized silica has strong negative electrostatic propensity, and hydrophobized alumina has strong positive electrostatic propensity, thus having a substantial electrostatic impact on the toner. Accordingly, there is an urgent need for a method of manufacturing monodisperse inorganic particles without aggregation among particles, with nanoscale particles that are also uniform in size and suitable for mass production, and that can be used in high-value-added high-definition toners and next-generation color toners that have a small particle size and require the addition of large quantities of external additives to the toner.

SUMMARY OF INVENTION

Problem to be Resolved

The present invention, in seeking to resolve the above-described deficiencies of the prior art, has as its objective a method of manufacturing titania nanoparticles, and specifically to a method of manufacturing titania nanoparticles wherein the particle size is uniform, it is possible to manufacture monodisperse particles without aggregation among particles, a uniform coating can be applied, that is suitable to large-scale production, and that can obtain high-resolution images by maintaining the toner electric charge and electric charge distribution; the nanoparticles manufactured by said method, and the provision of said nanoparticles.

In addition, the present invention has the objective of providing a developer that enables a uniform coating and the obtaining of high-resolution images by maintaining toner charger and charge distribution.

Means of Resolving Problem

In order to attain the above objectives, the present invention provides a method of manufacturing titania nanoparticles comprising: (1) a stage wherein a salt or alkoxide of titania is mixed with a solvent and scanned with microwaves to synthesize a titania precursor; (2) a stage wherein an alkaline catalyst is added to the solvent containing titania precursor obtained in stage (1) above, so as to produce spherical nanoparticles of titanium hydroxide; (3) a stage wherein crystalline spherical titania particles are made through stages of drying and sintering the titanium hydroxide obtained in step (2) above; and (4) a step wherein the nanoparticles obtained in step (3) above are hydrophobized.

In addition, the present invention provides monodisperse spherical titania nanoparticles manufactured by said method.

Further, the present invention provides a developer that includes said spherical titania nanoparticles.

Effects

According to the method of manufacturing titania nanoparticles of the present invention, the size of particles is uniform, the manufacture of monodisperse particles without aggregation between particles is made possible, a uniform coating is made possible, and images of high resolution suitable for mass production can be obtained by maintaining the charge and charge distribution of the toner; when the toner external additive for developing obtained from said titania nanoparticles is used, a uniform coating is possible, and high-resolution images can be obtained by maintaining the charge and charge distribution of the toner.

DETAILED DESCRIPTION OF THE INVENTION

The following descriptions of detailed embodiments are for exemplifying the principles and advantages of the inventions claimed herein. They are not to be taken in any way as limitations on the scope of the inventions.

The toner described hereinbelow in this specification ("toner") includes both color toner and black/white toner. In addition, "spherical" refers not solely to a perfect sphere, but includes spheroids with a sphericity of 0.6-1. Sphericity (in the case of a sphere) refers to the ratio of the surface of area of a sphere having the same volume as the actual particle to the surface area of the actual particle.

The method of manufacturing titania nanoparticles of the present invention enables the manufacturing of particles of a uniform size and is appropriate for mass production according to studies of the synthesis process technology for spherical titania nanoparticles, and can resolve the problems in aggregation due to positive or negative charge occurring when using an external toner additive such as the silica or alumina of the prior art, through coating the surface of the monodisperse spherical particle with a hydrophobic substance.

The method of manufacturing titania nanoparticles of the present invention comprises: (1) a stage wherein a salt or alkoxide of titania is mixed with a solvent and scanned with microwaves to synthesize a titania precursor; (2) a stage wherein an alkaline catalyst is added to the solvent containing titania precursor obtained in stage (1) above, so as to produce spherical nanoparticles of titanium hydroxide; (3) a stage wherein crystalline spherical titania particles are made through stages of drying and sintering the titanium hydroxide obtained in step (2) above; and (4) a stage wherein the nanoparticles obtained in step (3) above are hydrophobized.

The individual steps of the method of manufacturing titania nanoparticles of the present invention can be described in detail as follows.

[Step 1]

The present step involves the making of a spherical titania precursor by first mixing titanium salt or titanium alkoxide with solvent and then scanning with microwaves; the microwaves used have a wavelength of 300-3000 MHz; the solvent is instantly heated by the microwave scanning, and the titania precursor is formed.

Figure 2:
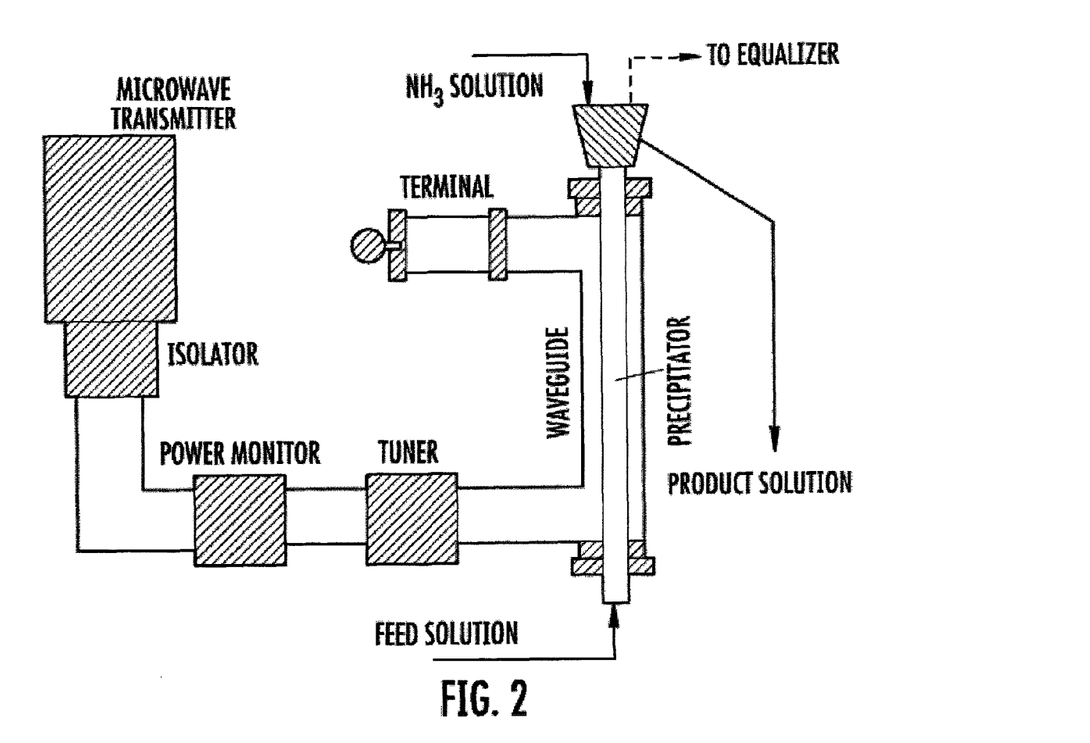
FIG. 2 is a schematic diagram of the titania nanoparticle manufacturing method of the present invention, including a microwave scanning device
Figure 3:
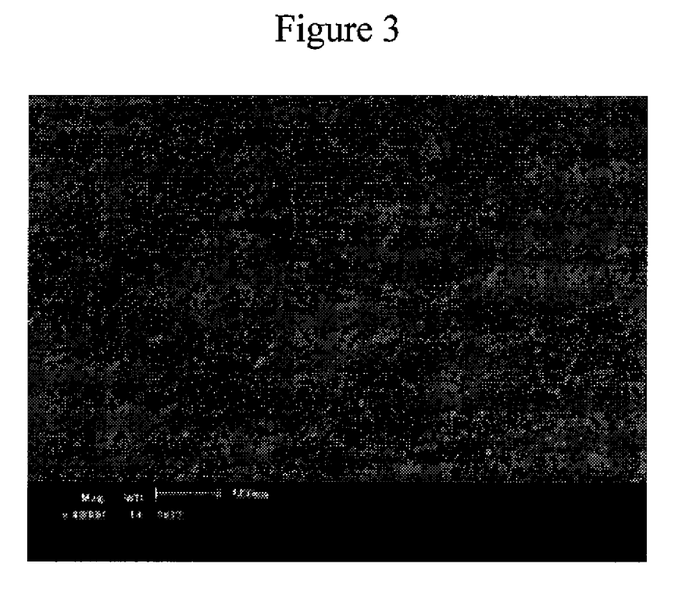
FIGS. 3 through 6 are scanning electron microscopy (SEM) photographs of titania nanoparticle manufactured according to the respective practical examples of the present invention.

It is preferable in this step (1) that the solvent be passed through a reaction tube that is scanned by the microwaves, as depicted in FIG. 2; by way of a specific example, it is possible to adjust the reaction outlet temperature to 70-80° C. by proceeding at a solvent fluid velocity of 300-1500 cc/min in the reaction tube furnished by a microwave scanning device with a maximum output of 5 kW, having an isolator and a magnetron generating 2450 MHz, and setting the reaction speed pass-through time 10-60 sec.

For said titania salt, for example titanium oxychloride, titanium chloride, titanium nitrate, or titanium sulfate may be used; for said titanium alkoxide, a C1-C12 titanium alkoxide may be used; by way of a specific example, titanium ethoxide, titanium isopropoxide, or titanium butoxide may be used.

Said solvent is not limited to any solvent that can dissolve titanium salt or titanium alkoxide; by way of specific example, water, alcohol or an aqueous solution of alcohol may be used. For the alcohol, it is preferable that a C1-C5 alcohol be used; specific examples include methyl alcohol, ethyl alcohol, propyl alcohol, isopropyl alcohol, and butyl alcohol, either singly or in mixture; it is most preferable that the solvent be an aqueous solution of alcohol containing 30-95 vol % alcohol.

In addition, the concentration of said titania salt or titania alkoxide in the solvent should be 0.1-1 M/liter; a dispersant may be used to prevent aggregation, and said dispersant may be such as HPC, PVA, or PVP; of these, HPC allows the most monodisperse particles to be obtained; the quantity of dispersant used should preferably be 0.1-2 g per liter of the total mixture.

[Step 2]

In Step (2) of the present invention, an alkaline catalyst is added to the solution containing the titania precursor obtained in step (1) above, to produce titanium hydroxide. Here it is preferable that the pH of the solution be adjusted to the 5-10 range by the addition of said alkali.

Said alkaline catalyst may suitably be a compound containing an amine or hydroxy group, or an aqueous solution thereof; specific examples of this include ammonia, sodium hydroxide, alkyl amines, and mixtures thereof.

[Step 3]

In step (3) of the present invention, the titania hydroxide obtained in step (2) above is dried and sintered; it is preferable that this drying be performed for 4 to 12 hours at 100-130° C., after preparatory drying for 1 to 3 hours at 50-70° C. In addition, the sintering step involves imparting a crystalline character; it is preferable that sintering be performed for 1 to 4 hours at 600-800° C. so as to acquire a rutile shape.

[Step 4]

Next, in step (4) of the present invention, the surface of the titania nanoparticles obtained in step (3) above is hydrophobized so as finally to produce titania nanoparticles with a hydrophobized surface.

Said hydrophobization may be performed using an ordinary silane coupling agent or titanium coupling agent; specific examples of a silane couple agent include the hydrophobization agents hexamethyldisilazane (HMDS), methyltrimethoxysilane (MTMS), dimethyldiethoxysilane (DMDES), and trimethylethoxysilane (TMES); specific examples of a titanium coupling agent include the hydrophobization agents isopropyl triisostearoyl titanate (KR-TTS), isopropyl dimethaacryl isostearoyl titanate (KR-7), isopropyl tri(dodecyl)benzenesulfonyl titanate (KR-9S), isopropyl tri (dioctyl)pyrophosphato titanate (KR-38S), di(cumyl)phenyl oxoethylene titanate (KR-134S), di(dioctyl)pyrophosphate oxoethylene titanate (KR-138S), neopentyl(diallyl)oxy, and tri(dioctyl)pyro-phosphato titanate (LICA-38).

Said hydrophobization agent may be used in quantities of 1 to 20 weight parts per 100 weight parts of titania nanoparticles (relative to the solid component).

The titania nanoparticles manufactured according to the present invention described above have a monodisperse, spherical form with nearly identical size; the surfaces of these monodisperse spherical particles is coated with a hydrophobic substance, thereby enabling effective use as a external toner additive.

The size of titania nanoparticles of the present invention, thus manufactured, can be adjusted at will; when used as an external toner additive, the size should be from 30 to 200 nm; as needed, the spheres may have a median diameter of 30 nm, 50 nm, 100 nm, 150 nm, or 200 nm.

In addition, the titania nanoparticles of the present invention show a contact angle of 100° or greater with respect to water. (In the case of the contact angle with water, the measured limit value was 170°, but in theory it could be up to 180°.) If said contact angle with water is less than 100°, hydrophobicity will suffer and when used as an external toner additive, the print quality of the toner may suffer due to either the adsorption of airborne moisture or the formation of aggregates.

In addition, it is preferable that the specific surface area of the titania nanoparticles be between 20 and 100 m2/g. If said specific surface area is less than 20 m2/g, the aggregation of particles may be severe; because this makes it difficult for the final coating of the toner with external additive to be uniform, it may cause a problematic deterioration in toner print quality; if it exceeds 100 m2/g, this indicates that the initial particles will be very small, which also makes the hydrophobic coating of individual particles difficult; this may cause a problematic failure of some areas to print due to the toner surface being completely surrounded even at low quantities. 26-10

The titania nanoparticles of the present invention manufactured as above-described may be used as external toner additives, and specifically as external toner additives for electrostatic image development. Said external toner additives may be used separately, or also as two or more types together.

When said titania nanoparticles are used as an external toner additive, the ratio of admixture should preferably be from 0.01 to 20 weight parts with respect to 100 weight parts of toner particles; it is even more preferable that 0.1 to 5 weight parts be used. If the admixture ratio is within said range, sufficient adhesion to the toner particles will occur, and not only will good fluidity be obtained, but there will also be a positive improvement in the electrostatic propensity of the toner particles.

Said titania nanoparticles can simply adhere mechanically to the toner particle surface, or may also be fixed gradually to the surface. In addition, the entire surface of the toner particle may be covered, or a portion may be covered.

Toner for electrostatic image development using titania nanoparticles as an external toner additive as above-described may be used as a single-component developer, but it is also possible to blend this with a carrier and use as a 2-component developer. When used as a 2-component developer, the external toner additive should not be added to the toner particles in advance, but only when the carrier is mixed with the toner particles to carry out the surface coating of the toner particles.

This carrier can be any commonly-known carrier such as iron, and can be mixed according to the mixing ratios that are commonly known.

Hereinbelow, in order to assist in the understanding of the present invention, preferred embodiments are presented; however, these embodiments merely exemplify the present invention and the scope of the present invention is not limited by the embodiments below.

PRACTICAL EXAMPLES

Embodiment 1

Practical Example 1: Manufacture of Spherical Titania Nanoparticles of 30 nm Diameter A microwave scanning device (Japan Radio Corporation, JRC: microwave generation device (NJA)) was furnished as shown in FIG. 1 and synthesis was carried out under the conditions of Table 1 below; as a result, spherical titania precursors with an average diameter of 30 nm could be obtained, and after filtering and drying these, heat treatment was performed to yield a powder of titania nanoparticles having a size of 30 nm.

Figure 7:
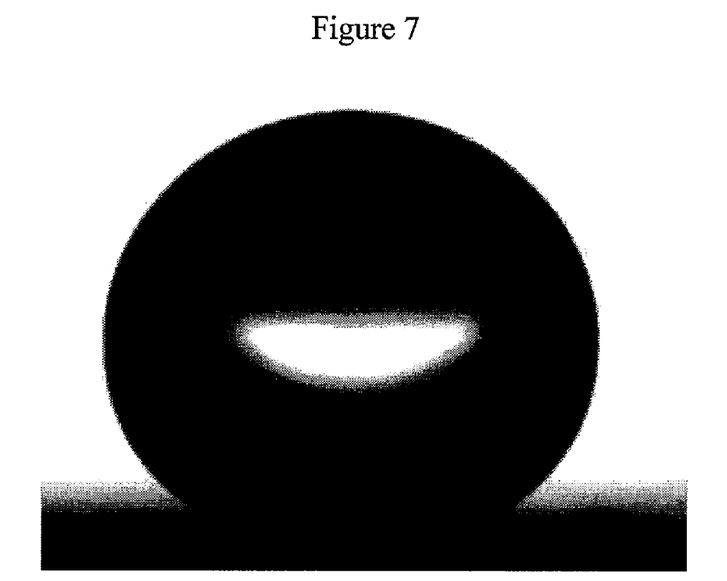
FIGS. 7 through 10 are photographs of the contact angle with respect to water of the titania nanoparticles manufactured according to the respective practical examples of the present invention.

The specific surface area of said powder was measured to be 58 m2/g. Said yielded titania nanoparticles were added to dimethyldiethoxysilane (DMDES) at 16.57 weight parts per 100 weight parts, and refluxing and hydrophobization was performed thereon to obtain titania nanoparticles. The contact angle of the surface-treated titania nanoparticles was confirmed by measurement to be at least 150°, as shown in FIG. 7. 26-12

Embodiment 2

Figure 4:
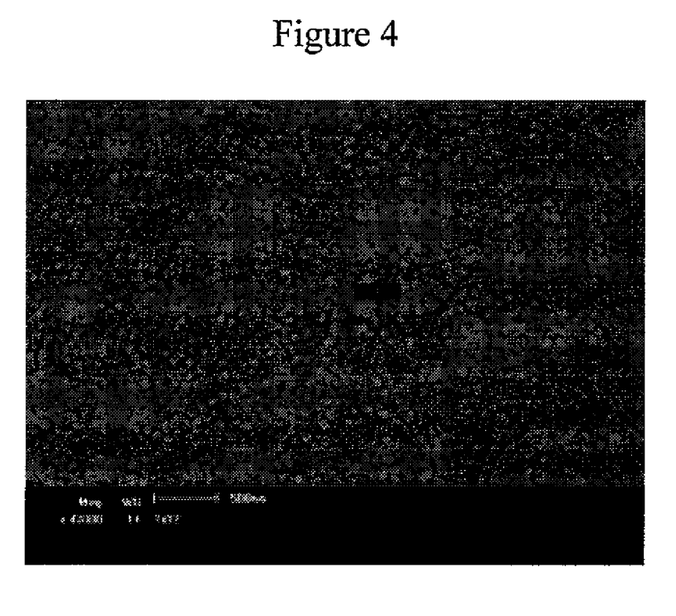
Figure 8:
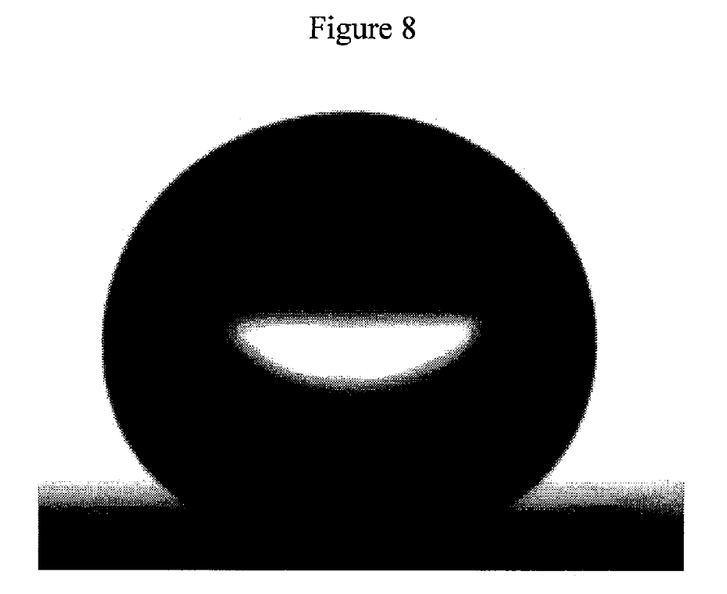

Practical Example 2: Manufacture of Spherical Titania Nanoparticles of 50 nm Diameter The microwave scanning device (please indicate manufacturer and product name) used in Practical Example 1 above was employed and synthesis was carried out under the conditions of Table 1 below; as a result, spherical titania precursors with an average diameter of 50 nm could be obtained, and after filtering and drying these, heat treatment was performed to yield a powder of titania nanoparticles having a size of 50 nm, as shown in FIG. 4. The specific surface area of said powder was measured to be 42 m2/g. Said yielded titania nanoparticles were added to dimethyldiethoxysilane (DMDES) at 12 weight parts per 100 weight parts, and refluxing and hydrophobization was performed thereon to obtain titania nanoparticles. The contact angle of the surface-treated titania nanoparticles was confirmed by measurement to be at least 150°, as shown in FIG. 8.

Embodiment 3

Figure 5:
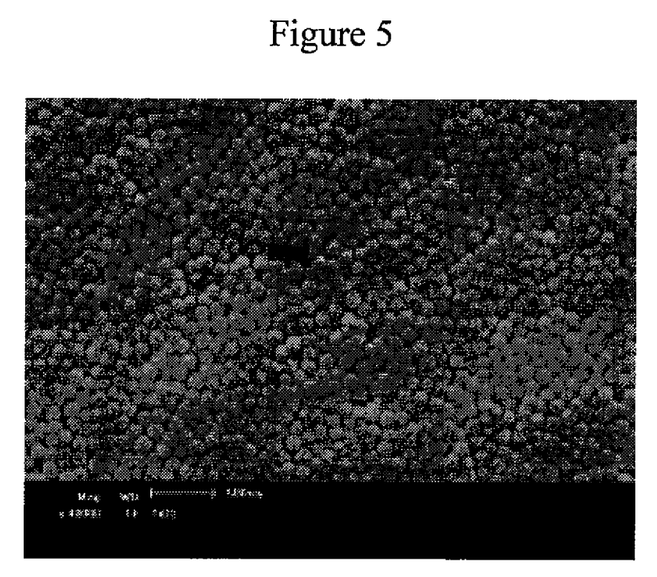
Figure 6:
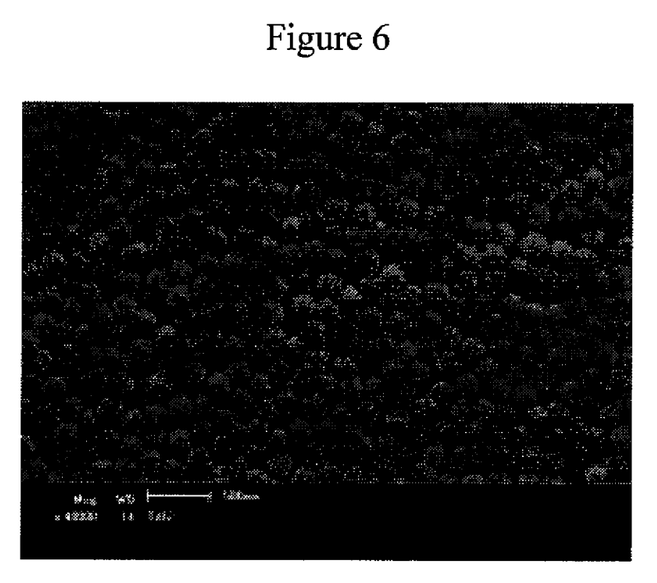
Figure 9:
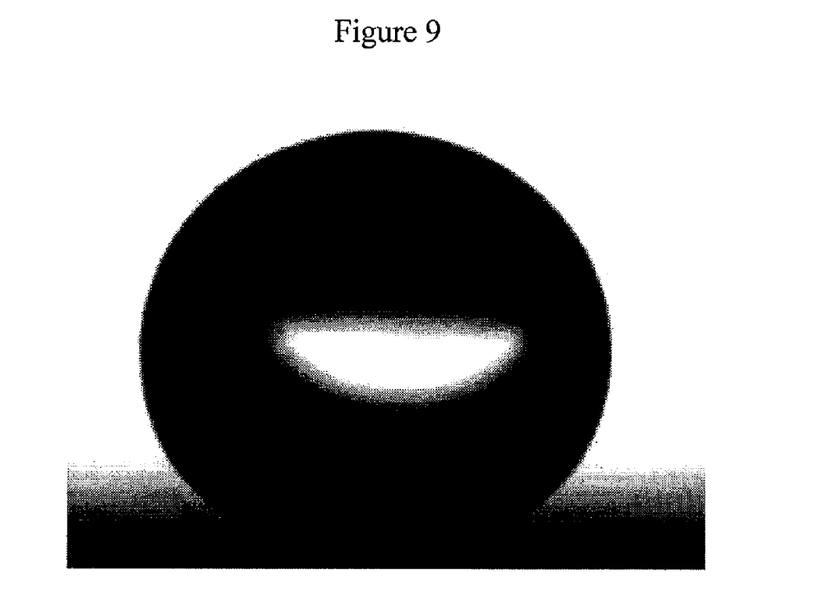

Practical Example 3: Manufacture of Spherical Titania Nanoparticles of 100 nm Diameter The microwave scanning device (please indicate manufacturer and product name) used in Practical Example 1 above was employed and synthesis was carried out under the conditions of Table 1 below; as a result, spherical titania precursors with an average diameter of 100 nm could be obtained, and after filtering and drying these, heat treatment was performed to yield a powder of titania nanoparticles having a size of 100 nm, as shown in FIG. 5. The specific surface area of said powder was measured to be 25 m2/g. Said yielded titania nanoparticles were added to dimethyldiethoxysilane (DMDES) at 7.14 weight parts per 100 weight parts, and refluxing and hydrophobization was performed thereon to obtain titania nanoparticles. The contact angle of the surface-treated titania nanoparticles was confirmed by measurement to be at least 150°, as shown in FIG. 9.

Embodiment 4

Figure 10:
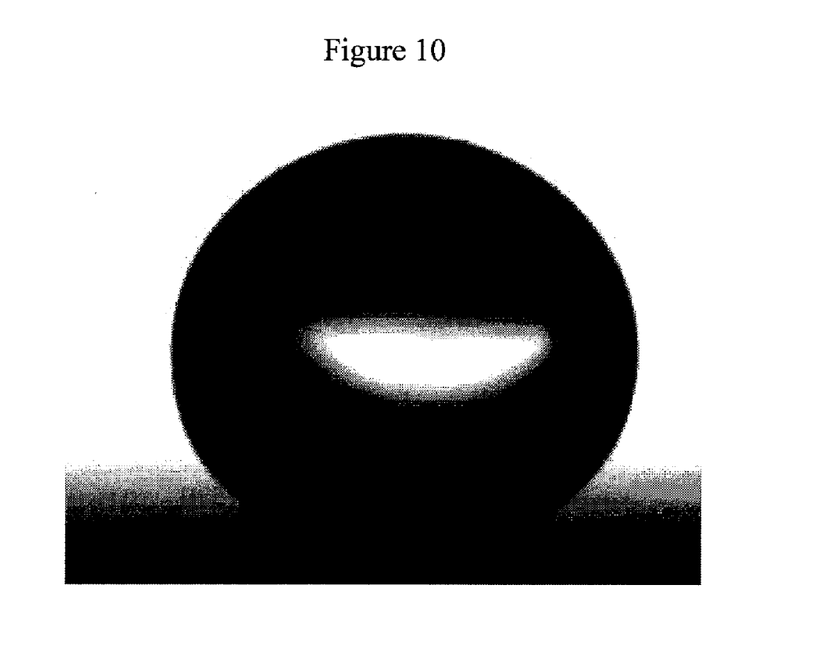

Practical Example 4: Manufacture of Spherical Titania Nanoparticles of 200 nm Diameter The microwave scanning device (please indicate manufacturer and product name) used in Practical Example 1 above was employed and synthesis was carried out under the conditions of Table 1 below; as a result, spherical titania precursors with an average diameter of 200 nm could be obtained, and after filtering and drying these, heat treatment was performed to yield a powder of titania nanoparticles having a size of 200 nm, as shown in FIG. 5. The specific surface area of said powder was measured to be 17 m2/g. Said yielded titania nanoparticles were added to dimethyldiethoxysilane (DMDES) at 4.86 weight parts per 100 weight parts, and refluxing and hydrophobization was performed thereon to obtain titania nanoparticles. The contact angle of the surface-treated titania nanoparticles was confirmed by measurement to be at least 150°, as shown in FIG. 10.

TABLE 1

| Operation | Practical Example 1 | Practical Example 2 | Practical Example 3 | Practical Example 4 |
|---|---|---|---|---|
| TiOCl2 concentration | 0.02M | 0.04M | 0.06M | 0.1M |
| Reaction outlet temperature (° C.) | 76 | 77 | 78 | 73 |
| Flow Rate (cc/min) | 1020 | 910 | 800 | 750 |
| Res. Time (sec) | 12.7 | 14.1 | 16.2 | 17.6 |
| pH (NH4OH 1N solution) | 7.57 | 8.87 | 8.43 | 8.20 |
| Output Sample Average diameter (nm) | ≈30 | ≈50 | ≈100 | ≈200 |

Practical Examples 5 through 8

Manufacture of Toner Mixed with External Additive (Including a Developer Component)

After fusing 4 weight parts of colorant (product name: Carmine 6BC, Smika Color Mfr.) to 96 weight parts of polyester resin with a softening point of 100° C. and a glass transition temperature of 60° C., while kneading and crushing, it was separated to yield toner with an average particle diameter of 7 µm. Toner mixed with external additives was manufactured (Practical Examples 5-8) by mixing 0.3 g each of the titania nanoparticles produced in Practical Examples 1 through 4 above to 10 g of this toner.

In order to verify the performance of the developer of the present invention, the developer produced in Practical Examples 5 through 8 above was used and measured with respect to the quantity of toner used, by the method below; the results thereof are shown in Table 2.

Measurement was performed by a) a step wherein the weight of the CRU (toner cartridge) was measured before performing the experiment;

(b) a step wherein 5000 prints were made on writing/A4 sized paper;

(c) a step wherein after the completion of 5000 prints, the weight of the CRU was measured; and (d) a step wherein the consumption of toner per 5000 prints was obtained, and next the amount of toner consumed in print 1 sheet was obtained. By way of a comparison example, a developer manufactured in the same fashion as Practical Example 5, except that none of the above-described titania nanoparticles of the present invention were used, was employed (Comparison Example 1).

TABLE 2

| 1-component developer | Example 5 | Example 6 | Example 7 | Example 8 | Example 1 |
|---|---|---|---|---|---|
| Toner usage (mg/pg @78/80) | 17.7 | 18.3 | 16.9 | 19.6 | 23.8 |

When the developer of Examples 5-8 of the present invention was used, a clear image of high quality was obtained in the prints, and in particular, as is apparent in Table 2, a clear reduction in toner consumption could be observed.

What is claimed is:

1. A method of manufacturing titania nanoparticles, comprising: (1) a step wherein a salt or alkoxide of titania is mixed with a solvent and scanned with microwaves to synthesize a titania precursor; (2) a step wherein an alkaline catalyst is added to the solvent and the titania precursor obtained in step (1) to produce spherical nanoparticles of titanium hydroxide; (3) a step wherein crystalline spherical titania particles are made by-drying and sintering the titanium hydroxide; and (4) a step wherein the crystalline spherical titania particles obtained in step (3) are hydrophobized.

2. The method of manufacturing titania nanoparticles of claim 1, wherein the titania salt or titania alkoxide of step (1) comprises one or more titania salt or titania alkoxide selected from the group consisting of titanium oxychloride, titanium chloride, titanium nitrate, titanium sulfate, and C1-C12 titanium alkoxides.

3. The method of manufacturing titania nanoparticles of claim 1, wherein the alkaline catalyst is a compound containing an amine group, hydroxy group, or an aqueous solution of an amine group or hydroxy group.

4. The method of manufacturing titania nanoparticles of claim 1, wherein the alkaline catalyst is added so that the pH of the combined salt or alkoxide of titania and solvent is between 5 and 10 after the addition of the catalyst.

5. The method of manufacturing titania nanoparticles of claim 1, wherein the drying takes place over 4 to 12 hours at 100-130° C. after preparatory drying at 50-70° C. over 1 to 3 hours.

6. The method of manufacturing titania nanoparticles of claim 1, wherein the sintering takes place over 1 to 4 hours at 600-800° C.

7. The method of manufacturing titania nanoparticles of claim 1, wherein the hydrophobization of step (4) is performed with one or more hydrophobization agents selected from the group consisting of hexamethyldisilazane, methyltrimethoxysilane, dimethyldiethoxysilane, and trimethylethoxysilane, isopropyl triisostearoyl titanate, isopropyl dimethaacryl isostearoyl titanate, isopropyl tri(dodecyl)benzenesulfonyl titanate, isopropyl tri(dioctyl)pyrophosphato titanate, di(cumyl)phenyl oxoethylene titanate, di(dioctyl) pyrophosphate oxoethylene titanate, neopentyl(diallyl)oxy, and tri(dioctyl)pyro-phosphato titanate.

8. The method of manufacturing titania nanoparticles of claim 7, wherein the hydrophobization agent is used at 1 to 20 weight parts with respect to 100 weight parts of crystalline titania nanoparticles, relative to the solid component.

* * * * *